United States Patent
Miao

(10) Patent No.: US 9,086,550 B2
(45) Date of Patent: Jul. 21, 2015

(54) OPTICAL DEVICE PACKAGING STRUCTURE AND OPTICAL DEVICE MODULE

(75) Inventor: Qizhuang Miao, Wuhan (CN)

(73) Assignee: WUHAN UNICELL OPTICAL DEVICES CO., LTD., Wuhan (CH)

( * ) Notice: Subject to any disclaimer, the term of this patent is extended or adjusted under 35 U.S.C. 154(b) by 0 days.

(21) Appl. No.: 13/559,689

(22) Filed: Jul. 27, 2012

(65) Prior Publication Data

US 2012/0288243 A1 Nov. 15, 2012

Related U.S. Application Data

(63) Continuation-in-part of application No. PCT/CN2010/080116, filed on Dec. 22, 2010.

(30) Foreign Application Priority Data

Jan. 28, 2010 (CN) .......................... 2010 1 0114191

(51) Int. Cl.
*G02B 6/42* (2006.01)
*G02B 6/293* (2006.01)

(52) U.S. Cl.
CPC .......... *G02B 6/4214* (2013.01); *G02B 6/29362* (2013.01); *G02B 6/4215* (2013.01); *G02B 6/4246* (2013.01)

(58) Field of Classification Search
CPC ...................................................... G02B 6/4214
See application file for complete search history.

(56) References Cited

U.S. PATENT DOCUMENTS

| | | | |
|---|---|---|---|
| 6,493,121 B1 * | 12/2002 | Althaus .......................... | 398/135 |
| 7,258,494 B2 * | 8/2007 | Park et al. ....................... | 385/89 |
| 8,655,181 B2 * | 2/2014 | Kondo et al. .................. | 398/138 |

* cited by examiner

*Primary Examiner* — Omar R Rojas
(74) *Attorney, Agent, or Firm* — Matthias Scholl P.C.; Matthias Scholl

(57) ABSTRACT

An optical device packaging structure, including a main body (B). One or more V-shaped grooves (B1) are formed in the main body (B), and an optical signal transmission hole system communicated with two side walls of the V-shaped groove (B1) is disposed in the main body (B). The optical signal transmission hole system includes an optical signal transmission hole perpendicular and/or parallel to the central line of the included angle of the V-shaped groove, and the included angle of the V-shaped groove is 90°±10°. An optical device module packaged by the optical device packaging structure is also provided.

17 Claims, 10 Drawing Sheets

OPTICAL DEVICE PACKAGING STRUCTURE AND OPTICAL DEVICE MODULE

CROSS-REFERENCE TO RELATED APPLICATIONS

This application is a continuation-in-part of International Patent Application No. PCT/CN2010/080116 with an international filing date of Dec. 22, 2010, designating the United States, now pending, and further claims priority benefits to Chinese Patent Application No. 201010114191.6 filed Jan. 28, 2010. The contents of all of the aforementioned applications, including any intervening amendments thereto, are incorporated herein by reference. Inquiries from the public to applicants or assignees concerning this document or the related applications should be directed to: Matthias Scholl RC., Attn.: Dr. Matthias Scholl Esq., 14781 Memorial Dr., Suite 1319, Houston, Tex. 77079.

BACKGROUND OF THE INVENTION

1. Field of the Invention

This invention relates to an optical device packaging structure and an optical device module.

2. Description of the Related Art

For the designs of conventional single fiber bi-directional optical devices and single fiber tri-directional optical devices, a packaging body and a filter plate carrier are designed separately, a filter plate is first stuck onto the filter plate carrier, and then the filter plate carrier is welded into a whole with the packaging body through aligning, positioning, and laser welding, so that the management of input, output, and transmission of various optical signals of lasers, detectors, and external optical fibers is finished.

Similarly, in the structural design of light path management based on a filter plate or lens, a separate design method is mainly adopted. A packaging body is designed separately with a filter plate or a lens holder, and then combined together with the filter plate or the lens holder. The design is convenient for processing of parts, however, it's time-consuming to allow the filter plate carrier or the lens holder to be connected into a whole with the packaging body and ensure the optical path alignment relationship among the laser, detector, and external optical fiber which are connected with the packaging body respectively, and the loss of the rate of finished products is caused.

SUMMARY OF THE INVENTION

In view of the above-described problems, it is one objective of the invention to provide an optical device packaging structure and an optical device module, in which a packaging body and a filter plate or a lens holder are integrated, thereby greatly improving the coupling efficiency and production efficiency of the optical device. The optical device packaging structure is particularly suitable for the design of a single fiber bi-directional optical device module and a single fiber tri-directional optical device module for a fiber-to-the-home optical module.

A V-shaped groove body is used as a packaging structure of a BOSA optical fiber device, and the structure can adopt a single V-shaped groove or continuous V-shaped groove, for the management of optical signal transmission direction. The structure is suitable for the management of multi-wavelength optical signals and multi-path optical signals in the package of an optical fiber communication device, an optical fiber laser, and other photoelectric devices, and used for the structural design of fiber-to-the-home optical modules, for example, optical devices BOSA of a single fiber bi-directional optical module and a single fiber tri-directional optical module.

To achieve the above objective, in accordance with one embodiment of the invention, there is provided an optical device packaging structure, comprising a main body, wherein one or more V-shaped grooves are formed in the main body, an optical signal transmission hole system communicated with two side walls of the V-shaped groove is disposed in the main body, the optical signal transmission hole system comprises an optical signal transmission hole perpendicular and/or parallel to a central line of an included angle of the V-shaped groove, and the included angle of the V-shaped groove is 90°±10°.

In a class of this embodiment, the included angle of the V-shaped groove is 90°.

In a class of this embodiment, a horizontal transmission hole perpendicular to the central line of the included angle of the V-shaped groove comprises a first horizontal transmission hole and/or a second horizontal transmission hole communicated with the two side walls of the V-shaped groove, and the first horizontal transmission hole is coaxial with the second horizontal transmission hole.

In a class of this embodiment, the main body comprises a plurality of V-shaped grooves connected in series in the same direction, that is, adjacent horizontal transmission holes of adjacent V-shaped grooves are shared.

In a class of this embodiment, the main body comprises a plurality of V-shaped grooves, and one or more pairs of V-shaped grooves are connected oppositely, that is, a pair of oppositely connected V-shaped grooves is communicated in the main body via an optical signal vertical transmission hole parallel to the central line of the included angle of the V-shaped groove; the oppositely connected V-shaped grooves are communicated with other V-shaped grooves via the optical signal transmission hole in the main body as required.

In accordance with another embodiment of the invention, the invention provides an optical device module packaged through the optical device packaging structure. The optical device module comprises the main body comprising the V-shaped groove, a V-shaped notch of the V-shaped groove, the horizontal and vertical transmission holes in the V-shaped groove are connected with optical devices and an external optical signal interface, respectively, and optical management lenses are attached onto the two side walls of the V-shaped groove.

In a class of this embodiment, the V-shaped notch of the V-shaped groove in the main body is connected with a detector, the first horizontal transmission hole and the second horizontal transmission hole which are communicated with the two side walls of the V-shaped groove are connected with a laser and the external optical signal interface, respectively, and a first filter plate and a second filter plate are attached onto the two side walls of the V-shaped groove respectively to form a single fiber bi-directional optical device module.

In a class of this embodiment, the V-shaped notch of the V-shaped groove in the main body is connected with a laser, the first horizontal transmission hole communicated with one side wall of the V-shaped groove is connected with a detector, a filter plate is attached onto the side wall of the V-shaped groove corresponding to the first horizontal transmission hole, and the optical signal transmission hole parallel to the central line of the included angle of the V-shaped groove is connected with an external optical signal interface to form a single fiber bi-directional optical device module.

In a class of this embodiment, the V-shaped notch of the V-shaped groove in the main body is connected with a first detector, the optical signal transmission hole parallel to the central line of the included angle of the V-shaped groove is connected with a second detector, the first horizontal transmission hole communicated with the two side walls of the V-shaped groove is connected with a laser, the second horizontal transmission hole communicated with the two side walls of the V-shaped groove is connected with an external optical signal interface, and a first filter plate and a second filter plate are attached onto the two side walls of the V-shaped groove respectively to form a single fiber tri-directional optical device module.

In a class of this embodiment, the V-shaped notch shared by a first V-shaped groove and a second V-shaped groove in the main body is connected with a first detector, the optical signal transmission hole parallel to the central line of the included angle of the V-shaped groove is connected with a second detector, the first horizontal transmission hole communicated with one side wall of the first V-shaped groove is connected with a laser, a third horizontal transmission hole communicated with one side wall of the second V-shaped groove is connected with an external optical signal interface, and a first filter plate and a second filter plate are attached onto two outer side walls of the first V-shaped groove and the second V-shaped groove respectively to form a single fiber tri-directional optical device module.

In a class of this embodiment, a first V-shaped notch of the first V-shaped groove in the main body is connected with a laser, the first V-shaped groove is communicated with the second V-shaped groove through the optical signal transmission hole parallel to the central line of the included angle of the V-shaped groove, the first horizontal transmission hole of the first V-shaped groove is connected with the first detector, the second horizontal transmission hole of the second V-shaped groove is connected with the second detector, a second V-shaped notch of the second V-shaped groove is connected with an external optical signal interface, and a first filter plate and a second filter plate are attached onto the two side walls communicated with the first V-shaped groove and the second V-shaped groove respectively to form a single fiber tri-directional optical device module.

Advantages of the invention are summarized below. 1) By adopting the structural design of the V-shaped groove, the optical device packaging structure can perform effective management to the optical signal transmission direction, and is suitable for large-scale application, furthermore, the packaging structure is assembled by single parts, thereby reducing the production and use cost. 2) By adopting the V-shaped groove structure, the BOSA packaging structure is simplified, that is, the packaging body is integrated into a whole with the filter plate carrier, and the included angle of the V-shaped groove is 90°, thus the optical path alignment relationship among the laser, detector, and external optical fiber is ensured in the structure.

The packaging sequence of the traditionally designed optical device is as follows: firstly, sticking the filter plate onto the filter plate carrier, secondly, aligning, welding or sticking the filter plate carrier together with the packaging body, and thirdly, aligning, welding or sticking the laser, detector, and external optical fiber to the packaging body.

The packaging sequence of the optical device designed by the invention is as follows: sticking the filter plate onto the wall of the V-shaped groove of the packaging structure, and secondly, aligning, welding or sticking the laser, detector, and external optical fiber to the packaging structure.

The advantages are as follows:
1. The second step in the traditional packaging sequence is eliminated, thus the production efficiency is greatly improved, and the production cost is reduced;
2. The position of the traditionally designed filter plate is achieved by adjusting the filter plate carrier and the main body; in the invention, the filter plate is stuck on the main body and becomes a part of the main body, the position accuracy of the filter plate is further greatly enhanced, the position consistency is good, the laser, detector, and external optical fiber are aligned easily, and the alignment speed is high, thus the coupling efficiency is improved, that is, the production efficiency of package of the BOSA optical device is improved; and
3. For the above-mentioned reasons, the consistency in coupling light power of each port of the laser, detector, and external optical fiber is ensured, and thus the qualification rate of the products is effectively ensured.

DETAILED DESCRIPTION OF THE EMBODIMENTS

For further illustrating the invention, experiments detailing an optical device packaging structure and an optical device module are described below. It should be noted that the following examples are intended to describe and not to limit the invention.

Figure 1:
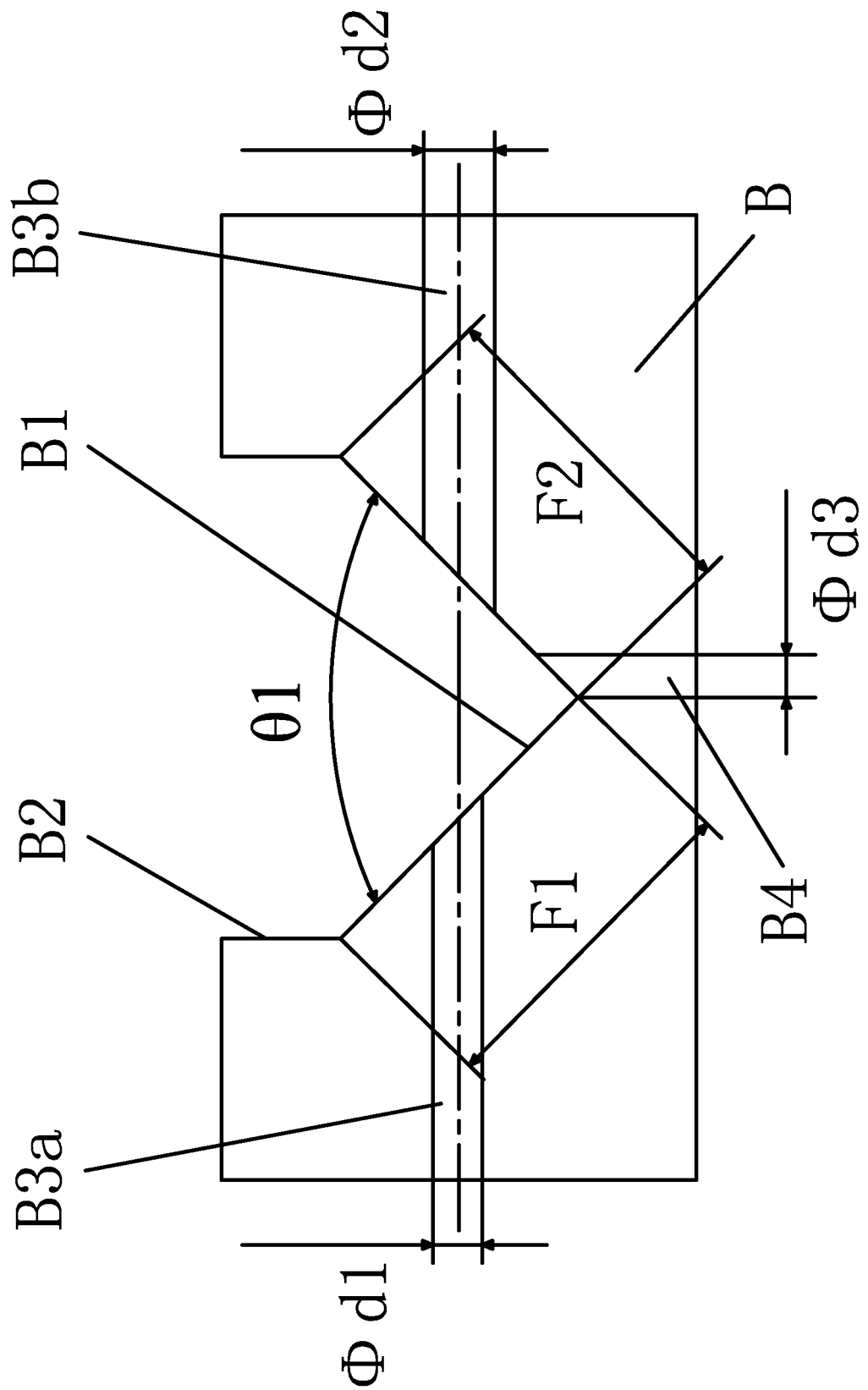
FIG. 1 is a basic structure cutaway view of an optical device packaging structure used for optical signal management.

FIG. 1 is a basic structure diagram of an optical device packaging structure used for optical signal management.

An optical device packaging structure used for optical signal management comprises a main body B. One or more V-shaped grooves B1 are formed in the main body B, and each of the V-shaped grooves B1 comprises a first side wall and a second side wall. An optical signal transmission hole system communicated with the two side walls of the V-shaped groove B1 is also arranged in the main body B and comprises optical signal transmission holes which are perpendicular and or parallel to the bisector of the included angle of the V-shaped groove, and the included angle θ1 of the V-shaped groove is 90°±10°. The optimum included angle θ1 of the V-shaped groove is 90°.

A horizontal transmission hole perpendicular to the central line of the included angle of the V-shaped groove B1 in the main body B comprises a first horizontal transmission hole B3a and a second horizontal transmission hole B3b. The first horizontal transmission hole B3a is coaxial with the second horizontal transmission hole B3b. An optical signal vertical transmission hole B4 parallel to the central line of the included angle of the V-shaped groove B1 is communicated with one side wall of the V-shaped groove B1. B2 is an outward V-shaped notch of the V-shaped groove B1. The V-shaped notch B2 comprises a third side wall and a fourth side wall.

Figure 2:
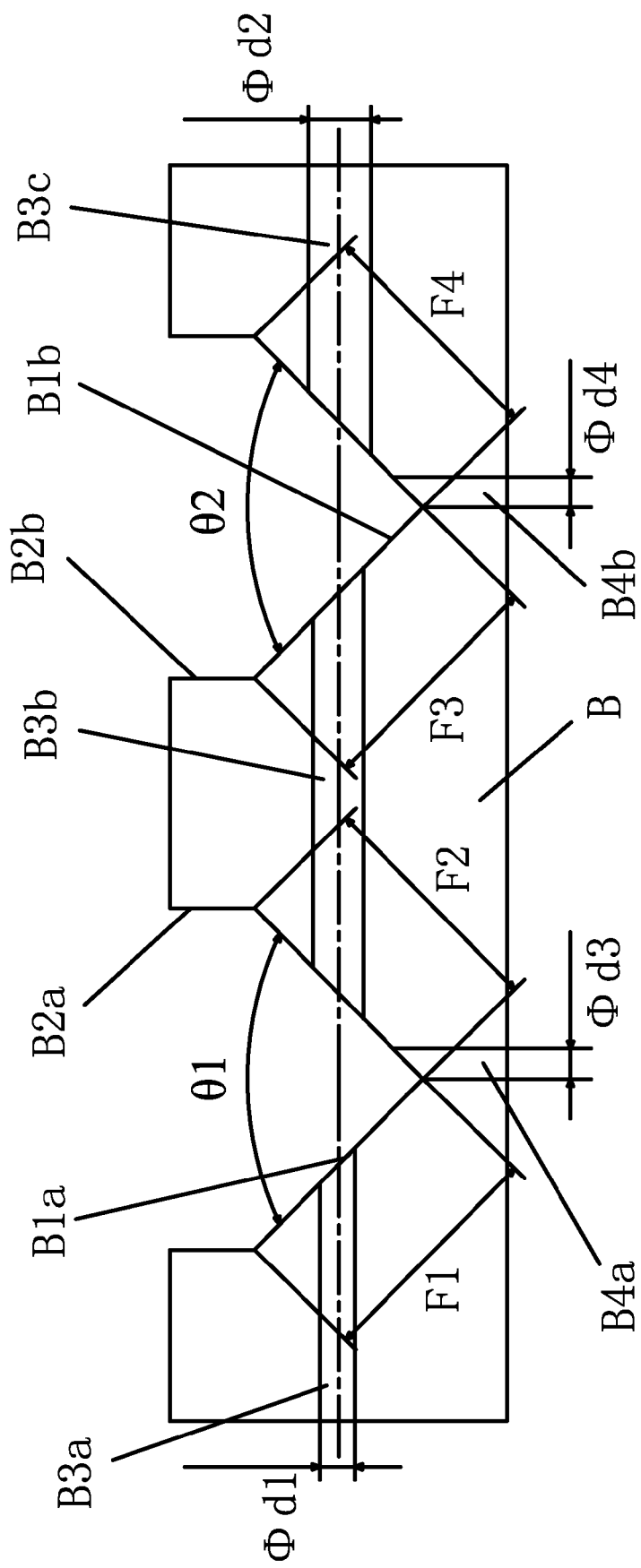
FIG. 2 is an optical path structure cutaway view of a main body provided with a plurality of V-shaped grooves arranged in parallel in the same direction.

FIG. 2 is an optical path structure cutaway view of the main body provided with a plurality of V-shaped grooves arranged in parallel in the same direction.

A plurality of V-shaped grooves connected in series in the same direction are formed in the main body B, only two V-shaped grooves are shown in the figure. A first V-shaped groove B1a and a second V-shaped groove B1b are connected in series, that is, the first V-shaped groove B1a is communicated with the second V-shaped groove B1b via the second horizontal transmission hole B3b. The first horizontal transmission hole B3a and a third horizontal transmission hole B3c are outward, B2a is a V-shaped notch of the first V-shaped groove B1a, and B2b is a V-shaped notch of the second V-shaped groove B1b. B4a is an optical signal vertical transmission hole of the first V-shaped groove B1a and parallel to the central line of the included angle of the V-shaped groove, and B4b is an optical signal vertical transmission hole of the second V-shaped groove B1b and parallel to the central line of the included angle of the V-shaped groove. When the number of the V-shaped groove is more than one, the rest can be described in the same manner.

The diameter of the hole system is represented with ⌀ d1, ⌀ d2, ⌀ d3, or ⌀ d4 and used for transmission of optical signals. ⌀ d3 and ⌀ d4 are dispensable as needed. A plurality of V-shaped groove structures can be arranged in parallel in the axial direction of ⌀ d1, or an unlimited number of V-shaped grooves F1, F2, F3, and F4 are mirrored in the radial direction of ⌀ d1. The V-shaped grooves F1, F2, F3, and F4 are used for placing filter plates C with optical signal wavelength selection or transmission direction change, and fixed by the walls of the V-shaped grooves, and the V-shaped grooves F1, F2, F3, and F4 are randomly selected according to the actual needs.

Figure 3:
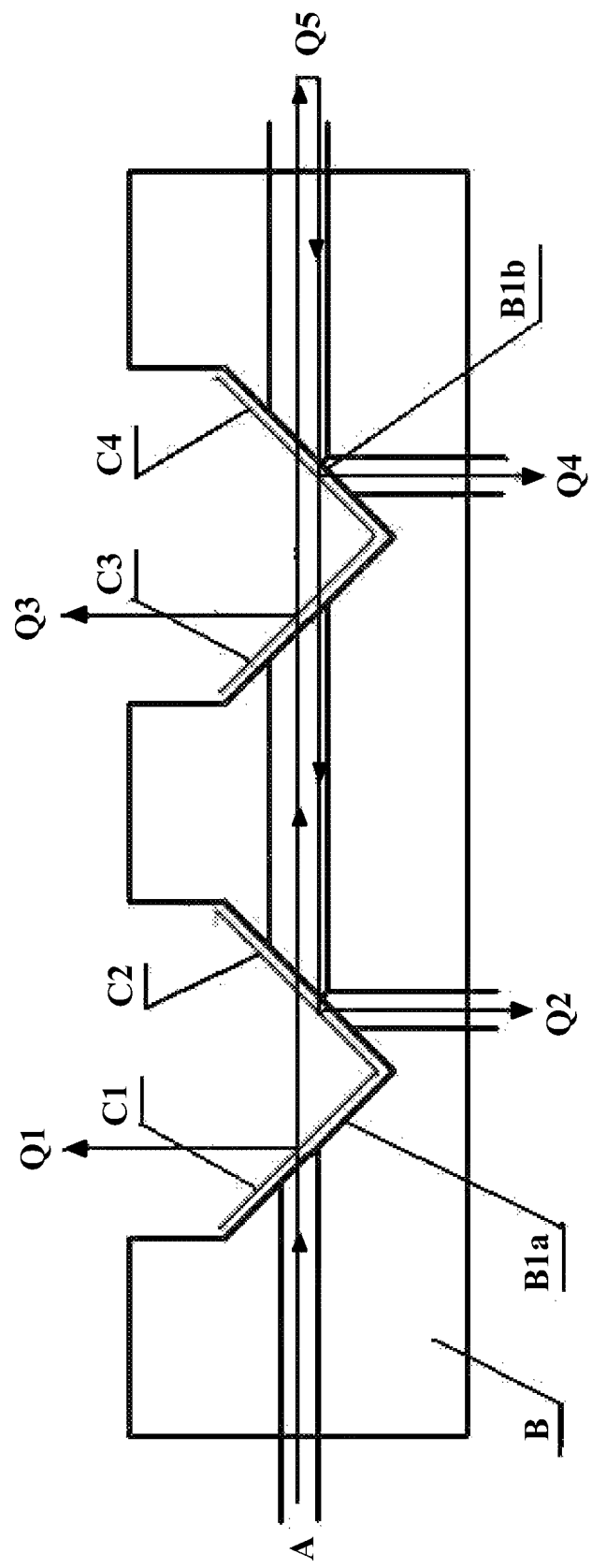
FIG. 3 is an optical path principle diagram of a main body provided with a plurality of V-shaped grooves arranged in parallel in the same direction.

FIG. 3 is an optical path principle diagram of the main body structure provided with a plurality of V-shaped grooves arranged in parallel in the same direction.

Working principle: filter plates C1, C2, C3, and C4 are placed in the first V-shaped groove B1a and the second V-shaped groove B1b respectively, A refers to a light source, the optical signals sent out by the light source first passes through the filter plate C1. The filter plate C1 is provided with a 90-degree refraction coating and a direct-through coating for an optical signal with specific wavelength. The optical signal with specific wavelength can reach Q1, and the optical signals with other wavelengths reach C2. Similarly, the filter plate C2 is also provided with a 90-degree refraction coating and a direct-through coating for an optical signal with specific wavelength, the optical signals with other wavelengths can reach Q2, and the optical signals with other wavelengths reach C3, and so on.

Similarly, if Q5 is also a light-emitting source, a 90-degree reflecting layer capable of passing through the filter plate C4 can reach Q4, and a 90-degree reflecting layer capable of passing through the filter plate C3 can reach Q3, and also can reach Q2 or Q1.

Figure 4:
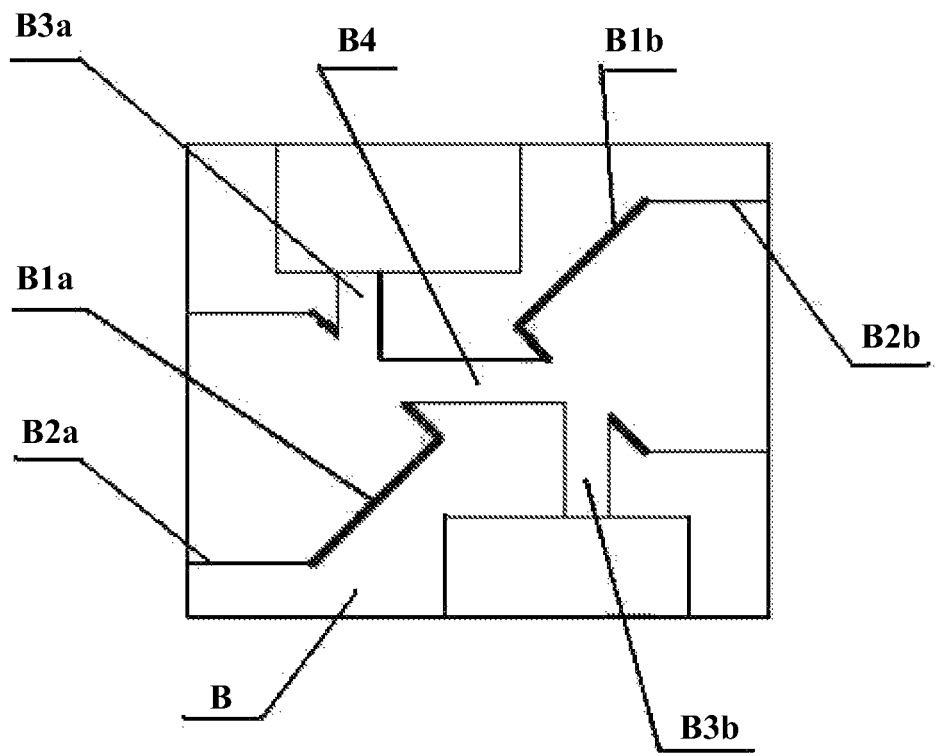
FIG. 4 is a cutaway view of a main body provided with a plurality of V-shaped grooves oppositely arranged in a staggered manner.

FIG. 4 is a structure diagram of the main body provided with a plurality of V-shaped grooves oppositely arranged in a staggered manner. A plurality of V-shaped grooves oppositely connected are formed in the main body B, that is, the optical signal transmission holes B4 (of the adjacent V-shaped grooves) parallel to the central line of the included angle of the V-shaped groove are communicated in the main body B.

The V-shaped grooves are oppositely connected in a staggered manner, and only two V-shaped grooves are shown in the figure. A first V-shaped groove B1a and a second V-shaped groove B1b are oppositely arranged in a staggered manner and communicated via the optical signal transmission holes B4 parallel to the central line of the included angle of the V-shaped groove. B2a is a V-shaped notch of the first V-shaped groove B1a, and B2b is a V-shaped notch of the second V-shaped groove B1b. B3a is a first horizontal transmission hole of the first V-shaped groove B1a and perpendicular to the central line of the included angle of the V-shaped groove, and B3b is a second horizontal transmission hole of the second V-shaped groove B1b and perpendicular to the central line of the included angle of the V-shaped groove.

Figure 5:
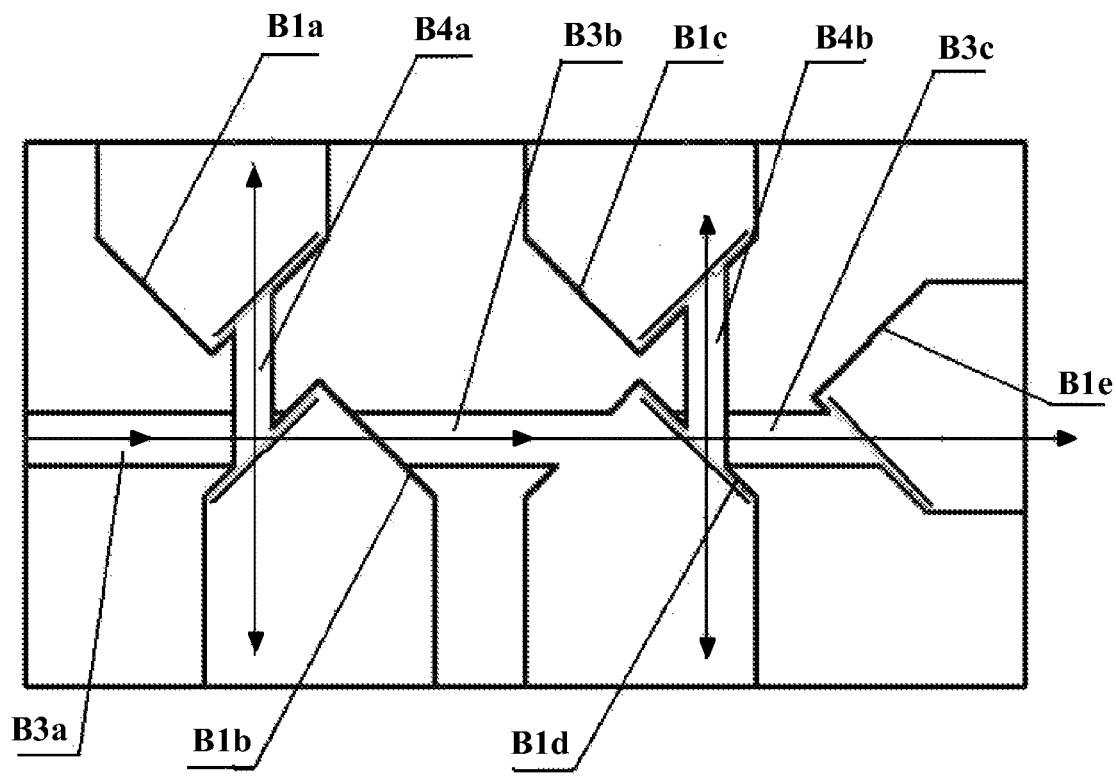
FIG. 5 is an optical path diagram of a main body provided with a plurality of V-shaped grooves oppositely arranged in a staggered manner and arranged horizontally.

FIG. 5 is a structure diagram of the main body provided with a plurality of V-shaped grooves oppositely arranged in a staggered manner and arranged horizontally.

A plurality of V-shaped grooves are formed in the main body B, and one or more pairs of V-shaped grooves in the plurality of the V-shaped grooves are connected oppositely, that is, a pair of oppositely connected V-shaped grooves is communicated in the main body B via the optical signal transmission holes B4 parallel to the central line of the included angle of the V-shaped groove; the oppositely connected V-shaped grooves are communicated with other V-shaped grooves via the optical signal transmission holes in the main body B as required.

The first V-shaped groove B1a and the second V-shaped groove B1b are oppositely arranged in a staggered manner and communicated via the optical signal vertical transmission hole B4a parallel to the central line of the included angle of the V-shaped groove; a third V-shaped groove B1c and a fourth V-shaped groove B1d are oppositely arranged in a staggered manner and communicated via the optical signal vertical transmission hole B4b parallel to the central line of the included angle of the V-shaped groove; two groups of the V-shaped grooves are arranged in parallel. The direction of a fifth V-shaped groove B1e is different from that of the first four V-shaped grooves; a first horizontal transmission hole B3a is communicated with the outside, two groups of V-shaped grooves oppositely arranged in a staggered manner are communicated with a second horizontal transmission hole B3b, and the second group of the fourth V-shaped groove B1d and the fifth V-shaped groove B1e which are oppositely arranged in a staggered manner are communicated via a third horizontal transmission hole B3c.

In a word, the number, arrangement, and connection of the V-shaped groove are flexible as required.

Each external interface part of an optical device module formed by packaging the main body is matched with connected components in shape and size, and all the components of the optical device module are connected together through the main body B.

The main body can be packaged into various optical device modules (comprising the main body B). The V-shaped notch of the V-shaped groove B1 of the main body, the outward horizontal and the vertical transmission holes in the main body B are connected with an optical device and an external optical signal interface respectively, and optical management lenses are attached onto the two side walls of the V-shaped groove B1.

The optical management lenses mainly comprise filter plates, lenses, refractive lenses, and reflecting mirrors.

Figure 6:
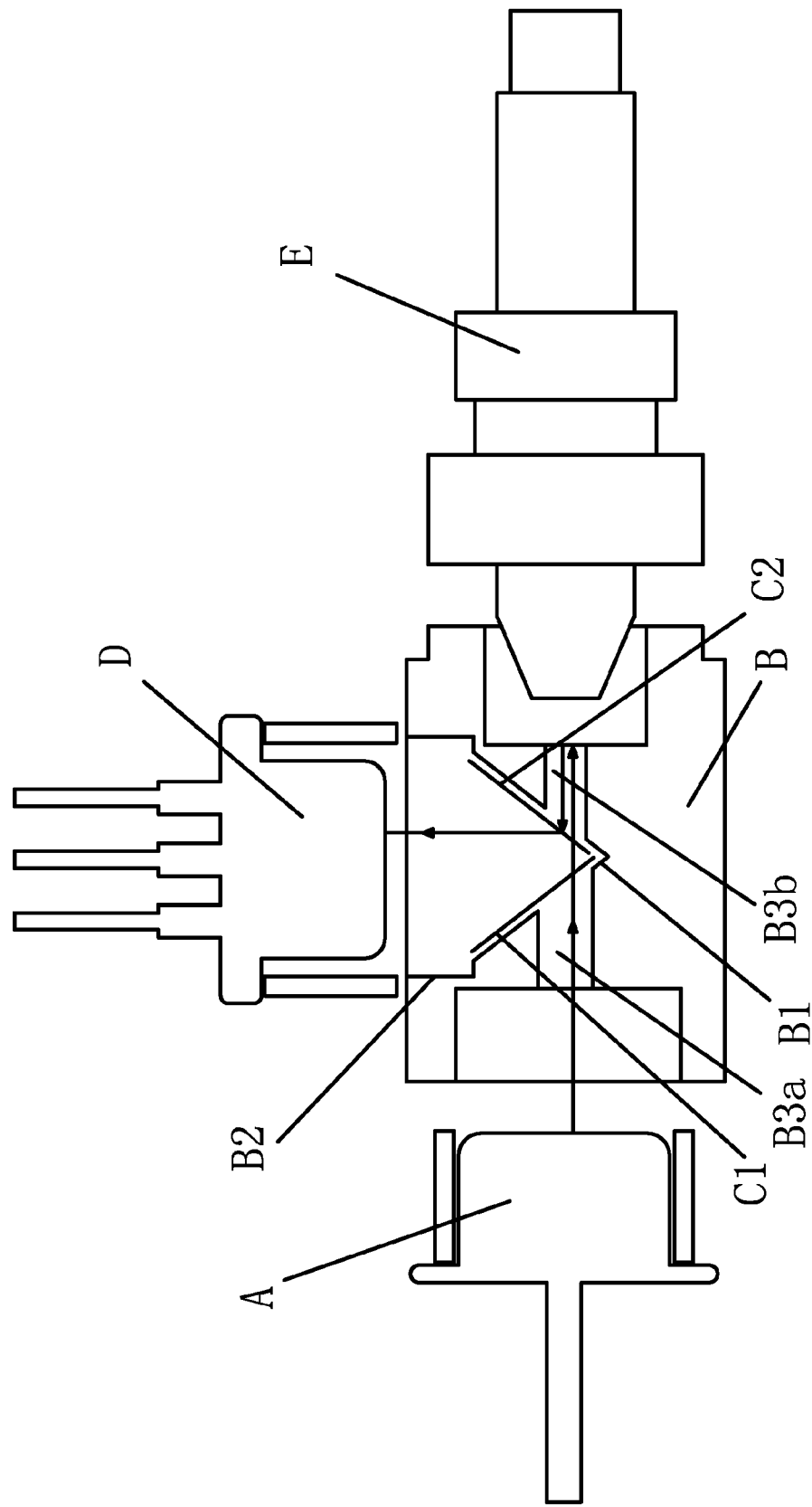
FIG. 6 is a basic structure diagram of a single fiber bi-directional optical device module.

FIG. 6 is a basic structure diagram of a single fiber bi-directional optical device module.

The embodiment is a special case adopting the main body shown in FIG. 1, that is, the optical signal vertical transmission hole parallel to the central line of the included angle of the V-shaped groove is not required, the V-shaped notch B2 of the V-shaped groove B1 in the main body B is connected with a detector D, the first horizontal transmission hole B3a and the second horizontal transmission hole B3b which are communicated with the two side walls of the V-shaped groove are connected with a laser A and an external optical signal interface E, and a first filter plate C1 and a second filter plate C2 are attached onto the two side walls of the V-shaped groove B1 respectively.

The embodiment adopts a key optical device of a single fiber bi-directional optical module, and the input/output optical signal is effectively managed through the V-shaped groove structure.

Working principle: A refers to a light source laser, B refers to the main body, all the components of the single fiber bi-directional device module are connected together via the main body B, C1 and C2 refer to filter plates, D refers to a detector, and E refers to an external optical signal interface adapter connected with an external optical fiber.

The working principle of converting local signals into optical signals and transmitting the optical signals is as follows: A sends out an optical signal, and the optical signal is coupled to enter the optical fiber connected with E after passing through direct-through filtering layers of C1 and C2, and then transferred to the external optical fiber.

The working principle of transmitting the external optical signal and converting the external optical signal into an electrical signal is as follows: the external optical signal is transmitted through the external optical fiber via the optical fiber in E, and then transmitted to D through the 90-degree reflecting layer of C2, and after D receives the optical signal, the optical signal is converted into an electrical signal.

Figure 7:
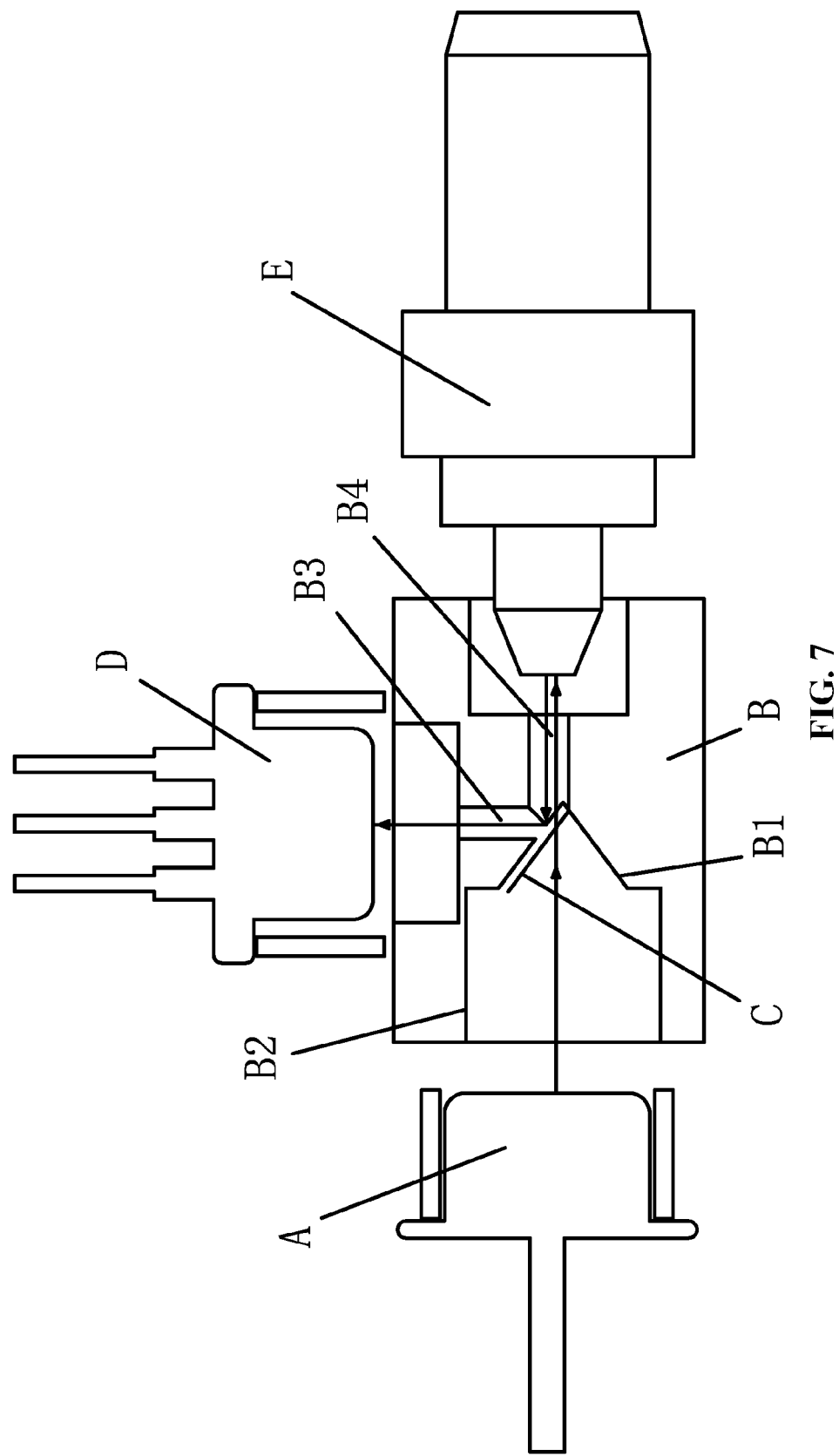
FIG. 7 is a basic structure diagram of another single fiber bi-directional optical device module.

FIG. 7 is a basic structure diagram of a second single fiber bi-directional optical device module.

The embodiment is another special case adopting the main body shown in FIG. 1, that is, the V-shaped notch B2 of the V-shaped groove B1 in the main body B is connected with a laser A, the first horizontal transmission hole B3 communicated with one side wall of the V-shaped groove is connected with a detector D, a filter plate C is attached onto the side wall of the V-shaped groove B1 corresponding to the first horizontal transmission hole B3, and the optical signal vertical transmission hole B4 parallel to the central line of the included angle of the V-shaped groove B1 is connected with an external optical signal interface E.

This is another form of the V-shaped groove structure used for the single fiber bi-directional optical device.

Working principle: A refers to a light source laser, B refers to the main body, all the components of the single fiber bi-directional device module are connected together via the Main body B, C refers to a filter plate, D refers to a detector, and E refers to an external optical signal interface adapter connected with an external optical fiber.

The working principle of converting local signals into optical signals and transmitting the optical signals is as follows: A sends out an optical signal, and the optical signal is coupled to enter the optical fiber connected with E after passing through direct-through filtering layers of C, and then transferred to the external optical fiber.

The working principle of transmitting the external optical signal and converting the external optical signal into an electrical signal is as follows: the external optical signal is transmitted through the external optical fiber via the optical fiber in E, and then transmitted to D through the 90-degree reflecting layer of C, and after D receives the optical signal, the optical signal is converted into an electrical signal.

Figure 8:
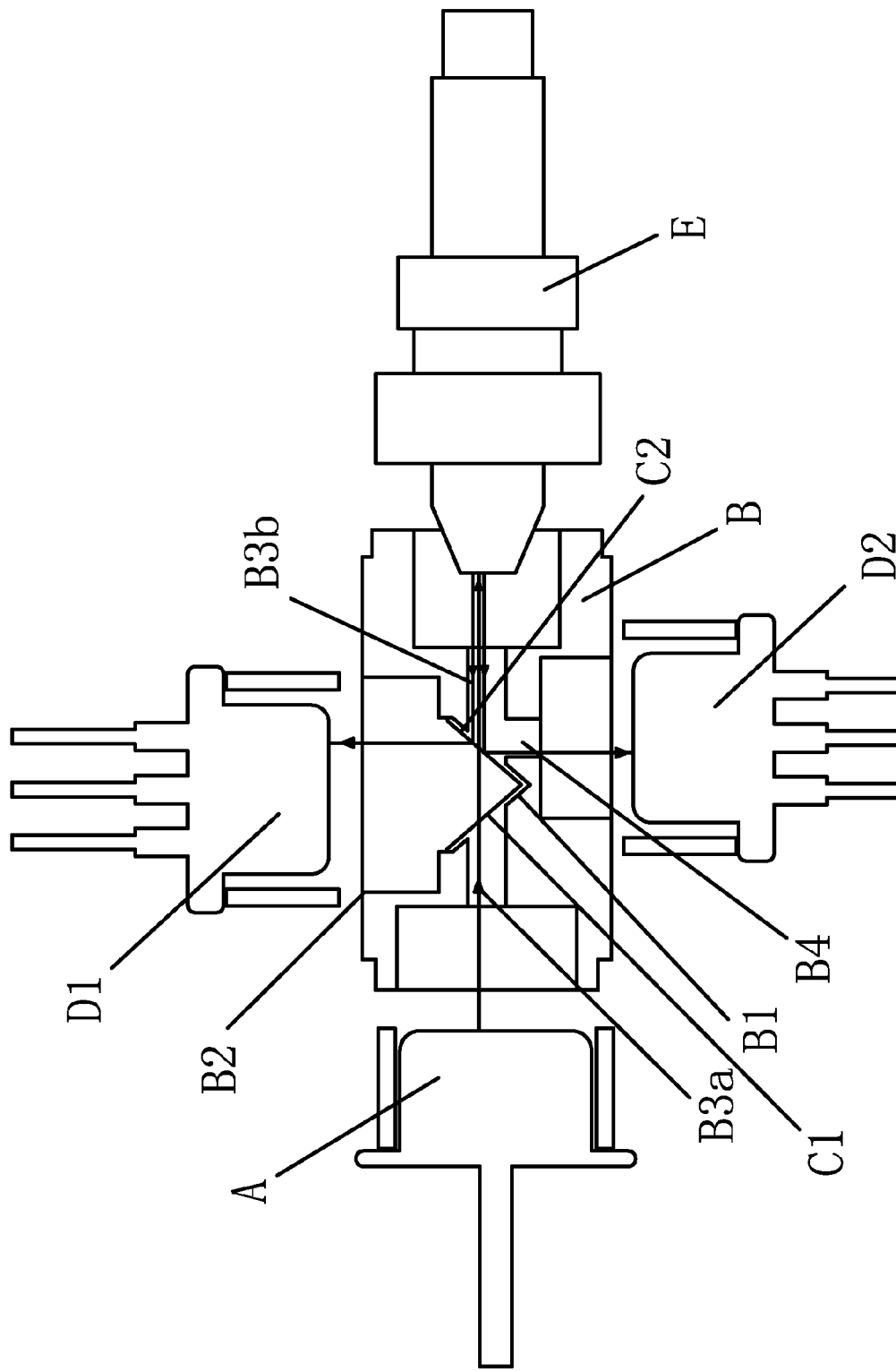
FIG. 8 is a basic structure diagram of a single fiber tri-directional optical device module.

FIG. 8 is a basic structure diagram of a single fiber tri-directional optical device module.

The embodiment adopts the main body structure shown in FIG. 1, the V-shaped notch B2 of the V-shaped groove in the main body B is connected with a first detector D1, the optical signal vertical transmission hole B4 parallel to the central line of the included angle of the V-shaped groove B1 is connected with a second detector D2, the first horizontal transmission hole B3a communicated with two side walls of the V-shaped groove is connected with a laser A, the second horizontal transmission hole B3b communicated with two side walls of the V-shaped groove is connected with an external optical signal interface E, and a first filter plate C1 and a second filter plate C2 are attached onto the two side walls of the V-shaped groove B1 respectively.

This is a key optical device of a signal fiber tri-directional optical module, and the input/output optical signal is effectively managed through the V-shaped groove structure.

Working principle: A refers to a light source laser, B refers to the main body, all the components of the single fiber tri-directional device module are connected together via the Main body B, C1 and C2 refers to filter plates, D1 refers to a data signal detector, D2 refers to an analog signal detector, and E refers to an external optical signal interface adapter connected with an external optical fiber.

The working principle of converting the local signals into optical signals and transmitting the optical signals is as follows: A sends out an optical signal, and the optical signal is coupled to enter the optical fiber connected with E after passing through direct-through filtering layers of C1 and C2, and then transferred to the external optical fiber.

The working principle of transmitting the external data optical signal and converting the external data optical signal into an data electrical signal is as follows: the external optical signal is transmitted through the external optical fiber via the optical fiber in E, and then transmitted to D1 through the 90-degree reflecting layer of C1, and after D1 receives the data optical signal, the analog optical signal is converted into a data electrical signal.

The working principle of transmitting the external analog optical signal and converting the external analog optical signal into an analog electrical signal is as follows: the external optical signal is transmitted through the external optical fiber via the optical fiber in E, and then transmitted to D2 through the reflecting layer of C2, and after D2 receives the analog optical signal, the analog optical signal is converted into an analog electrical signal.

Figure 9:
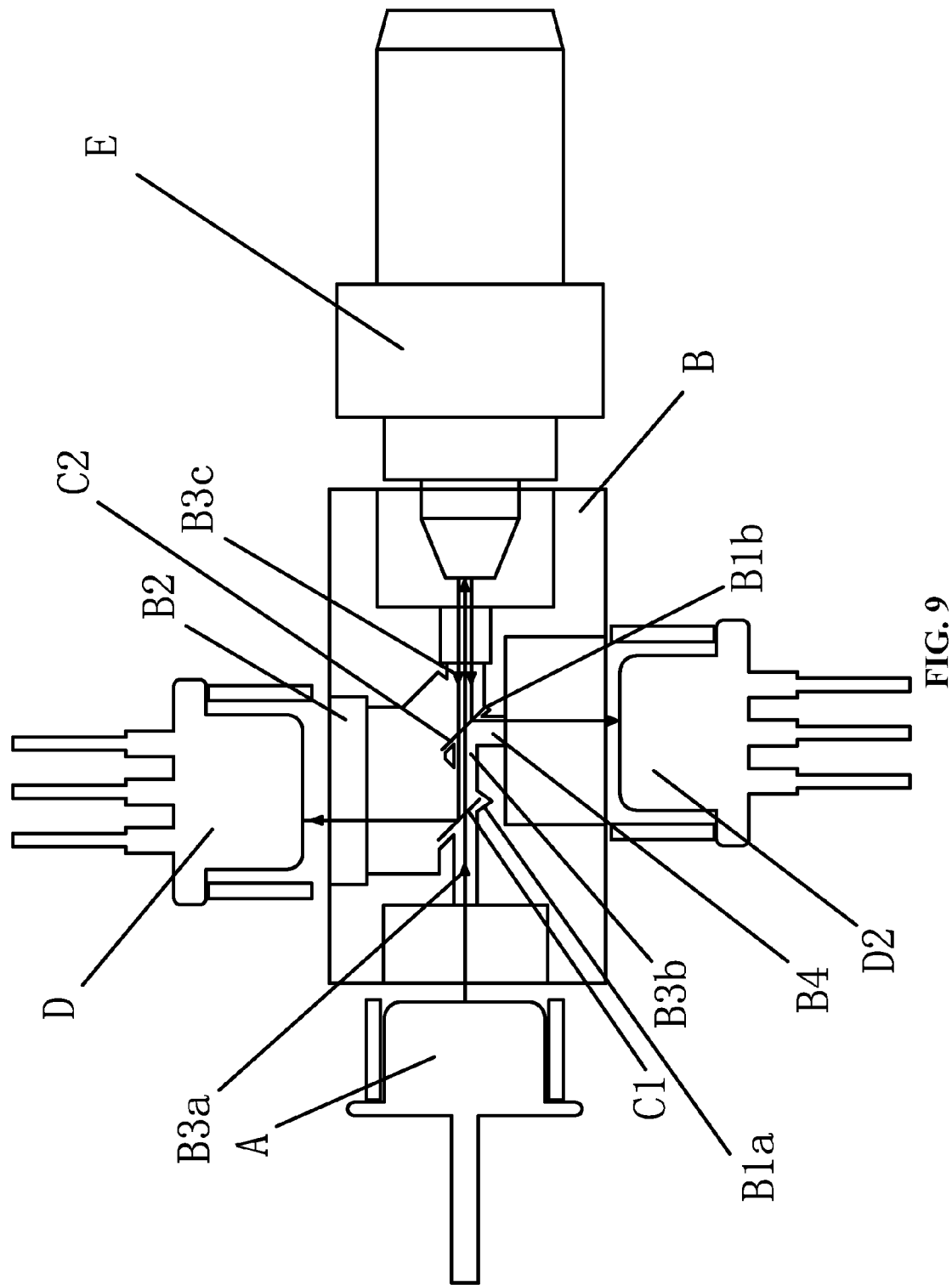
FIG. 9 is a basic structure diagram of a second single fiber tri-directional optical device module.

FIG. 9 is a basic structure diagram of a second single fiber tri-directional optical device module.

The embodiment adopts the main body structure shown in FIG. 2, the V-shaped notch B2 shared by a first V-shaped groove B1a and a second V-shaped groove B1b in the main body is connected with a first detector D1, the optical signal transmission hole B4 parallel to the central line of the included angle of the V-shaped groove B1 is connected with a second detector D2, the first horizontal transmission hole B3a communicated with one side wall of the first V-shaped groove B1a is connected with a laser A, a third horizontal transmission hole B3c communicated with one side wall of the second V-shaped groove B1b is connected with an external optical signal interface E, a second horizontal transmission hole B3b is communicated with two inner side walls of the first V-shaped groove B1a and the second V-shaped groove B1b, and a first filter plate C1 and a second filter plate C2 are attached onto the two outer side walls of the first V-shaped groove B1a and the second V-shaped groove B1b, respectively.

This is another form of the V-shaped groove structure used for the single fiber tri-directional optical device.

Working principle: A refers to a light source laser, B refers to the main body, all the components of the single fiber tri-directional device module are connected together via the Main body B, C1 and C2 refers to filter plates, D1 refers to a data signal detector, D2 refers to an analog signal detector, and E refers to an external optical signal interface adapter connected with an external optical fiber.

The working principle of converting the local signals into optical signals and transmitting the optical signals is as follows: A sends out an optical signal, and the optical signal is coupled to enter the optical fiber connected with E after passing through direct-through filtering layers of C1 and C2, and then transferred to the external optical fiber.

The working principle of transmitting the external data optical signal and converting the external data optical signal into an data electrical signal is as follows: the external optical signal is transmitted through the external optical fiber via the optical fiber in E, and then transmitted to D1 through the 90-degree reflecting layer of C1, and after D1 receives the data optical signal, the analog optical signal is converted into a data electrical signal.

The working principle of transmitting the external analog optical signal and converting the external analog optical signal into an analog electrical signal is as follows: the external optical signal is transmitted through the external optical fiber via the optical fiber in E, and then transmitted to D2 through the 90-degree reflecting layer of C2, and after D2 receives the analog optical signal, the analog optical signal is converted into an analog electrical signal.

Figure 10:
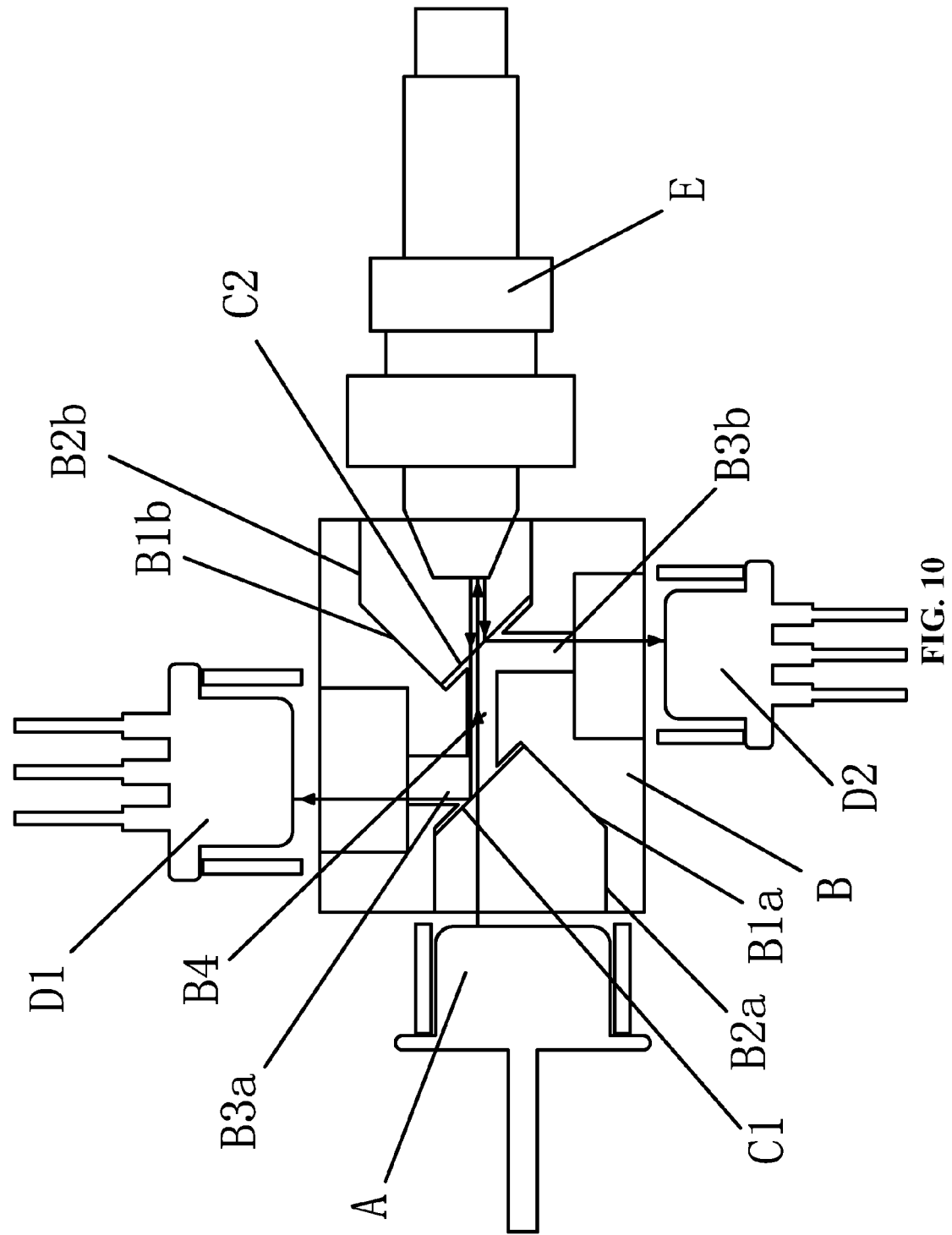
FIG. 10 is a basic structure diagram of a third single fiber tri-directional optical device module.

FIG. 10 is a basic structure diagram of a third single fiber tri-directional optical device module. The embodiment adopts the main body shown in FIG. 3, a first V-shaped notch B2a of the first V-shaped groove B1a in the main body is connected with a laser A, the first V-shaped groove B1a is communicated with the second V-shaped groove B1b through the optical signal transmission hole B4 parallel to the central line of the included angle of the V-shaped groove, the first horizontal transmission hole B3a of the first V-shaped groove B1a is connected with the first detector D1, the second horizontal transmission hole B3b of the second V-shaped groove B1b is connected with the second detector D2, a second V-shaped notch B2b of the second V-shaped groove B1b is connected with an external optical signal interface E, and a first filter plate C1 and a second filter plate C2 are attached onto the two side walls communicated with the first V-shaped groove B1a and the second V-shaped groove B1b respectively.

This is another form of the V-shaped groove structure used for the single fiber bi-directional optical device.

Working principle: A refers to a light source laser, B refers to the main body, all the components of the single fiber tri-directional device module are connected together via the Main body B, C1 and C2 refers to filter plates, D1 refers to a data signal detector, D2 refers to an analog signal detector, and E refers to an external optical signal interface adapter connected with an external optical fiber.

The working principle of converting the local signals into optical signals and transmitting the optical signals is as follows: A sends out an optical signal, and the optical signal is coupled to enter the optical fiber connected with E after passing through direct-through filtering layers of C1 and C2, and then transferred to the external optical fiber.

The working principle of transmitting the external data optical signal and converting the external data optical signal into an data electrical signal is as follows: the external optical signal is transmitted through the external optical fiber via the optical fiber in E, and then transmitted to D1 through the 90-degree reflecting layer of C1, and after D1 receives the data optical signal, the analog optical signal is converted into a data electrical signal.

The working principle of transmitting the external analog optical signal and converting the external analog optical signal into an analog electrical signal is as follows: the external optical signal is transmitted through the external optical fiber via the optical fiber in E, and then transmitted to D2 through the 90-degree reflecting layer of C2, and after D2 receives the analog optical signal, the analog optical signal is converted into an analog electrical signal.

The main body is used as a packaging structure of optical signal management, the structure comprises one or more V-shaped grooves, the arrangement and connection of the V-shaped groove is flexible as required, and the increase or elimination of the optical signal transmission hole system is flexible as required and free from the limitation of the above embodiments.

The structure is particularly suitable for the design of the BOSA structure of a fiber-to-the-home optical module, and the central line of the V-shaped groove is perpendicular to the direction of the optical signal direction; C can be a filter plate, lens, refractive lens or reflecting mirror and is fixed on the wall of the V-shaped groove.

Similarly, the optical device module packaged by the packaging structure is especially flexible as required and free from the limitation of the above embodiments.

The core of the invention is the design of the 90° V-shaped groove in the Main body. Thus, the BOSA packaging structure is simplified, and not only the packaging body is integrated into a whole with the filter plate carrier, but also the optical path alignment accuracy of the laser, detector, and external optical fiber is ensured in terms of the structure. Therefore, any management of the optical signal transmission direction through the V-shaped groove in the optical device packaging body belongs to the scope of protection of the invention.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An optical device packaging structure, comprising: a main body, wherein
a V-shaped groove is formed in the main body;
the V-shaped groove comprises a first side wall and a second side wall, the first side wall comprising a first end, the second side wall comprising a second end;
a V-shaped notch is formed in the main body;
the V-shaped notch comprises a third side wall and a fourth side wall;
an included angle is formed between the first side wall and the second side wall, the included angle having a bisector;
the third side wall is connected to the first end of the first side wall;
the fourth side wall is connected to the second end of the second side wall;
the V-shaped groove, the third side wall, and the fourth side wall are integral parts of the main body;
the third side wall and the fourth side wall are substantially parallel to the bisector of the included angle;
an optical signal transmission hole system is connected to the two side walls of the V-shaped groove and is disposed in the main body;
the optical signal transmission hole system comprises an optical signal transmission hole comprising a central line;
the central line of the optical signal transmission hole is perpendicular or parallel to the bisector of the included angle of the V-shaped groove; and
the included angle of the V-shaped groove is 90°±10°.

2. The packaging structure of claim 1, wherein the included angle of the V-shaped groove is 90°.

3. The packaging structure of claim 1, wherein the optical signal transmission hole system comprises a first horizontal transmission hole and a second horizontal transmission hole, and the first horizontal transmission hole is coaxial with the second horizontal transmission hole.

4. The packaging structure of claim 1, wherein a plurality of V-shaped grooves is connected in series and is formed in the main body, and each of the horizontal transmission holes is connected to two of the V-shaped grooves that are adjacent thereto.

5. The packaging structure of claim 3, wherein a plurality of V-shaped grooves is connected in series and is formed in the main body, and each of the horizontal transmission holes is connected to two of the V-shaped grooves adjacent thereto.

6. The packaging structure of claim 1, wherein
a plurality of V-shaped grooves are formed in the main body;
one or more pairs of V-shaped grooves are connected oppositely;
a pair of oppositely connected V-shaped grooves is communicated via an optical signal vertical transmission hole parallel to the bisector of the included angle of the V-shaped groove; and
the oppositely connected V-shaped grooves are communicated with other V-shaped grooves via the optical signal transmission hole in the main body as required.

7. The packaging structure of claim 2, wherein
a plurality of V-shaped grooves are formed in the main body;
one or more pairs of V-shaped grooves are connected oppositely;
a pair of oppositely connected V-shaped grooves is communicated via an optical signal vertical transmission hole parallel to the bisector of the included angle of the V-shaped groove; and
the oppositely connected V-shaped grooves are communicated with other V-shaped grooves via the optical signal transmission hole in the main body as required.

8. An optical device module, comprising the optical device packaging structure of claim 1, an optical device, an external optical signal interface, and an optical management lens, wherein the optical device and the external optical signal interface are respectively disposed in the V-shaped notch and the optical signal transmission hole, and the optical management lens is attached onto the two side walls of the V-shaped groove.

9. The optical device module of claim 8, further comprising a detector, a first horizontal transmission hole, a second horizontal transmission hole, a laser, a first filter plate, and a second filter plate, wherein
the V-shaped notch is connected to the detector;
the first horizontal transmission hole and the second horizontal transmission hole are connected to the two side walls of the V-shaped groove and are connected to the laser and the external optical signal interface, respectively; and
the first filter plate and the second filter plate are attached onto the two side walls of the V-shaped groove, respectively.

10. The optical device module of claim 8, wherein
the V-shaped notch is connected with a laser;
a first horizontal transmission hole communicated with one side wall of the V-shaped groove is connected with a detector;
a filter plate is attached onto the side wall of the V-shaped groove corresponding to the first horizontal transmission hole; and
an optical signal vertical transmission hole parallel to the bisector of the included angle of the V-shaped groove is connected with an external optical signal interface, to form a single fiber bi-directional optical device module.

11. The optical device module of claim 8, further comprising a first detector, a second detector, a vertical transmission hole, a first horizontal transmission hole, a second horizontal transmission hole, a laser, a first filter plate, and a second filter plate, wherein
the V-shaped notch is connected to the first detector;
the vertical transmission hole is parallel to the bisector of the included angle of the V-shaped groove and is connected to the second detector;
the first horizontal transmission hole is connected to the two side walls of the V-shaped groove and is connected to the laser;
the second horizontal transmission hole is connected to the two side walls and is connected to the external optical signal interface; and
the first filter plate and the second filter plate are attached onto the two side walls of the V-shaped groove respectively.

12. The optical device module of claim 8, wherein
the V-shaped notch shared by a first V-shaped groove and a second V-shaped groove in the main body is connected with a first detector;
an optical signal transmission hole parallel to the bisector of the included angle of the V-shaped groove is connected with a second detector;

a first horizontal transmission hole communicated with one side wall of the first V-shaped groove is connected with a laser;

a third horizontal transmission hole communicated with one side wall of the second V-shaped groove is connected with an external optical signal interface; and a first filter plate and a second filter plate are attached onto two outer side walls of the first V-shaped groove and the second V-shaped groove, respectively, to form a single fiber tri-directional optical device module.

13. The optical device module of claim 8, wherein a first V-shaped notch of a first V-shaped groove in the main body is connected with a laser;

the first V-shaped groove is communicated with a second V-shaped groove-through an optical signal transmission hole parallel to the bisector of the included angle of the V-shaped groove;

a first horizontal transmission hole of the first V-shaped groove is connected with a first detector;

a second horizontal transmission hole of the second V-shaped groove is connected with a second detector;

a second V-shaped notch of the second V-shaped groove is connected with an external optical signal interface; and a first filter plate and a second filter plate are attached onto the two side walls communicated with the first V-shaped groove and the second V-shaped groove, respectively, to form a single fiber tri-directional optical device module.

14. An optical device packaging structure for packaging a combination of an optical device, an external optical signal interface, and an optical management lens, the optical device packaging structure comprising a main body comprising a first side wall, a second side wall, a third side wall, a fourth side wall, and an optical signal transmission hole system, wherein:

the first side wall, the second side wall, the third side wall, and the fourth side wall are integral parts of the main body;

the first side wall comprises a first end and the second side wall comprises a second end;

a V-shaped groove is formed by the first side wall and the second side wall;

an included angle is formed between the first side wall and the second side wall, the included angle having a bisector;

a V-shaped notch is formed by the third side wall and the fourth side wall;

the third side wall is connected to the first end of the first side wall;

the fourth side wall is connected to the second end of the second side wall;

the third side wall and the fourth side wall are substantially parallel to the bisector;

the V-shaped groove is formed in the main body;

the optical signal transmission hole system is connected to the first side wall and the second side wall and is disposed in the main body;

the optical signal transmission hole system comprises an optical signal transmission hole, the optical signal transmission hole comprising a central line;

the central line is parallel to the bisector;

the V-shaped notch is adapted for receiving the optical device;

the optical signal transmission hole is adapted for receiving the external optical signal interface;

the first side wall and the second side wall are adapted for supporting the optical management lens; and the included angle is 90°±10°.

15. The packaging structure of claim 14, wherein the included angle is 90°.

16. The packaging structure of claim 14, wherein the optical signal transmission hole system comprises a first horizontal transmission hole and a second horizontal transmission hole, and the first horizontal transmission hole is coaxial with the second horizontal transmission hole.

17. The packaging structure of claim 14, wherein a plurality of V-shaped grooves is connected in series and is formed in the main body, and each of the horizontal transmission holes is connected to two of the V-shaped grooves adjacent thereto.

* * * * *